United States Patent [19]
DiSanzo et al.

[11] Patent Number: 5,144,348
[45] Date of Patent: Sep. 1, 1992

[54] IMAGE BEARING TEMPLATE FOR INSTANT FILM ASSEMBLAGES

[75] Inventors: Frederick L. DiSanzo, Waltham; George J. Farrell, Bedford, both of Mass.

[73] Assignee: Polaroid Corporation, Cambridge, Mass.

[21] Appl. No.: 620,897

[22] Filed: Dec. 3, 1990

[51] Int. Cl.$^5$ .............................................. G03B 17/24
[52] U.S. Cl. .................................... 354/108; 354/275; 354/296
[58] Field of Search .................... 355/39, 40; 354/275, 354/105, 106, 107, 108, 109, 276, 277, 283–285

[56] References Cited
U.S. PATENT DOCUMENTS

| | | | |
|---|---|---|---|
| 3,916,423 | 10/1975 | Ueda et al. | 354/108 |
| 4,268,144 | 5/1981 | Wheeler | 354/108 |
| 4,655,570 | 4/1987 | Jaffe | 354/107 |
| 4,816,848 | 3/1989 | Doyle, Jr. | 354/108 |
| 4,894,671 | 1/1990 | Wheeler | 354/108 |

Primary Examiner—L. T. Hix
Assistant Examiner—David M. Gray
Attorney, Agent, or Firm—Alfred E. Corrigan

[57] ABSTRACT

An image bearing template especially adapted for use with a film assemblage including a cassette containing instant type film units. Several embodiments are shown each of which includes means for preventing relative movement of the template relative to an exposure aperture in the cassette. Some of the template embodiments may be coupled with the cassette by the photographer while other embodiments of the template must be packaged with cassette and film units by the manufacturer.

11 Claims, 3 Drawing Sheets

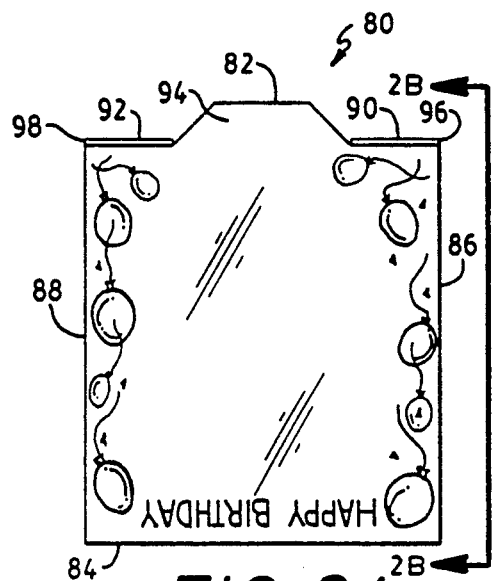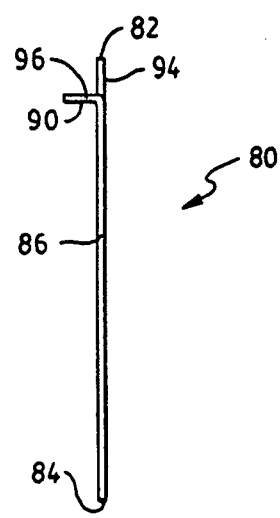
FIG. 2A  FIG. 2B
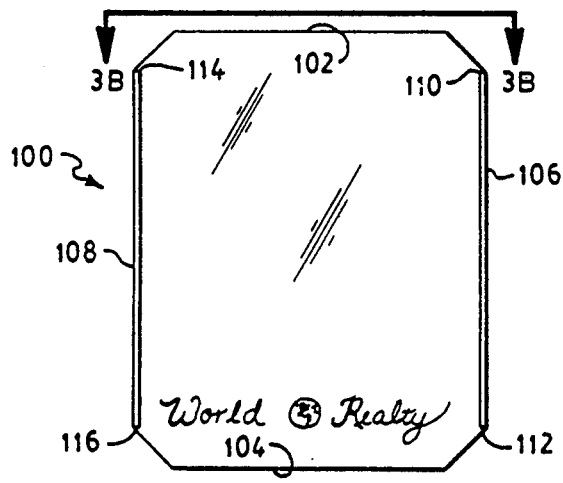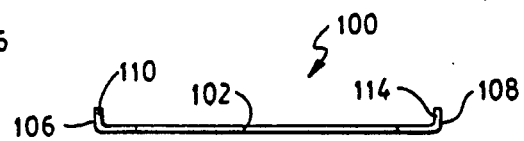
FIG. 3A  FIG. 3B
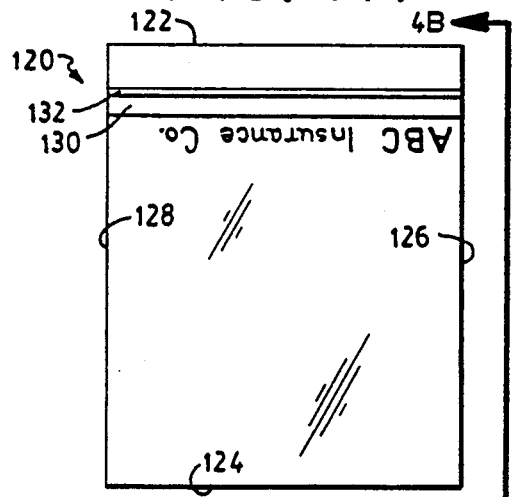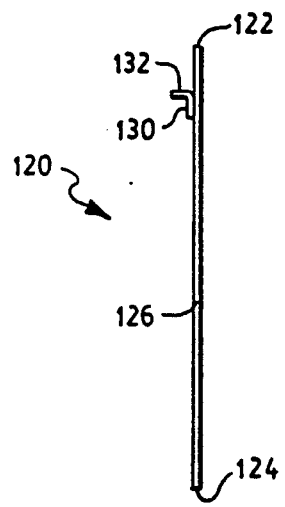
FIG. 4A  FIG. 4B

IMAGE BEARING TEMPLATE FOR INSTANT FILM ASSEMBLAGES

BACKGROUND OF THE INVENTION

The present invention relates to image bearing templates for masking or otherwise modifying the light image to which photographic film is exposed in a camera, and more particularly, it concerns such templates adapted to be used with instant film cassettes.

The current state-of-the-art relative to information or image bearing templates of the general class which includes the present invention are exemplified by the disclosures of U.S. Pat. Nos. 3,916,423 to Ueda et al. and 4,268,144 to Wheeler. In both of these patents, a substantially transparent template or mask having light blocking information or images thereon is adapted to be inserted in an exposure aperture or exposure window of commercially available instant film assemblages in which each of a succession of individual film units supplied in a cassette are advanced to the camera's focal plane as established by a forward wall of the cassette in which the exposure window is formed.

In the Ueda et al. patent, the template or mask is formed by a relatively thick and rigid plate of glass or similar material. In one form, the rigid template of Ueda et al. is a rectangular body dimensioned the same as the exposure window with four outwardly directed projections on the side edges intended to stress the material of the film cassette forming the exposure window to hold the template in place. In another form of the rigid template of Ueda et al., insertability of the rigid plate into the window is enabled by forming the major body of the plate with peripheral dimensions somewhat smaller than the film cassette window so that tabs projecting from opposite sides of the plate can be inserted through the window and will underlie the wall of the cassette housing in which the window is formed. The thickness of the plate causes diffraction of the subject image and results in displacement of the objective focal plane from the surface of the uppermost film unit in the cassette. Sharpness of the subject image can be accommodated by a combination of restricting the thickness of the tabs holding the plate in the window and selecting the index of refraction of the material from which the plate is formed to correct for displacement of the objective focal plane from the surface of the uppermost film unit.

The Wheeler '423 patent employs a relatively thin and pliant template having projecting tabs extending from three sides and adapted to underlie the cassette's forward wall in which the exposure window is formed. To retain the template against movement in one direction with an underlying film unit as the latter is ejected from the cassette for processing after exposure, a leading edge of the template is formed with a central, generally up-struck limit tab. To otherwise orient the template in relation to the exposure window Wheeler relies on edge portions of the thin sheet which, of necessity, fit within the cassette with clearance space between the template edges and the side walls of the film cassette. Also, insertion and removal of the Wheeler template requires manipulation at the image surface of the template. Further, the Wheeler template does not include means for preventing movement of the template toward the cassette's trailing end wall.

Other examples of image bearing templates may be found in U.S. Pat. Nos. 4,655,570, 4,816,848 and 4,894,671.

In light of the prior art, there exists a need for a thin image bearing template which does not distort or rely upon the resiliency of the exposure window frame in a film cassette for retention or insertion of the template, which insures both longitudinal and lateral positioning support of the template in the exposure window and which facilitates insertion and removal of the template without excessive manual contact with the image surface of the template.

SUMMARY OF THE INVENTION

In accordance with the present invention, an image bearing template which in some embodiments facilitate insertion and removal of the template, assures accurate positioning of the template in relation to the exposure window of such film cassettes, and which results in minimal displacement of the exposure surface of a film unit from the focal plane in which it is normally presented.

In a preferred embodiment of an image bearing template, the template is formed from a single sheet of resilient transparent material, e.g., MYLAR, on the upper surface of which a suitable image is printed. The template is dimensioned such that it may be manually inserted into a film cassette via an exposure window formed in a forward wall thereof, such insertion being accomplished with a minimum of distortion of the template. A u-shaped section is punched out of, or otherwise formed in, the template at a location between the template's leading and trailing edges. This u-shaped section extends upwardly from the surface of the template and is adapted to engage an edge of the cassette's exposure window such that during subsequent removal of an underlying film unit from the film cassette it prevents the template from being frictionally drawn along with the film unit. Further, the distance between the u-shaped section and the template's trailing edge is substantially equal to the corresponding distance between the aforementioned edge of the exposure window and the film cassette's trailing end wall, thus insuring that the template cannot be displaced toward the trailing end wall during handling of the camera in which the cassette is located. Still further, the template is formed with means for preventing lateral movement thereof relative to the cassette.

Several alternative embodiments of a template are disclosed including two which must be assembled in the cassette at the plant of the manufacture.

An object of the invention is to provide a thin, flexible, image bearing template for use with a film cassette having a plurality of instant film units therein, such template being structured to prevent relative movement between the template and an exposure window in the cassette.

Another object of the invention is to construct such a template such that it may be manually inserted into the film cassette prior to loading the cassette into a camera.

Still another object of the invention is to incorporate such a template as an element of a film assemblage at the time of packaging the assemblage at the factory.

Other objects of the invention will in part be obvious and will in part appear hereinafter. The invention accordingly comprises the construction, combination of elements and arrangement of parts which are exemplified in the following detailed description and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2A is a plan view of an alternative embodiment of an image bearing template for use with the film assemblage of FIG. 1;

FIG. 2B is a side view of the image bearing template of FIG. 2A, as viewed along the line 2B—2B;

FIG. 3A is a plan view of another embodiment of an image bearing template;

FIG. 3B is an end view of the image bearing template of FIG. 3A, taken along the line 3B—3B;

FIG. 4A is a plan view of still another embodiment of an image bearing template;

FIG. 4B is a side view of the image bearing template of FIG. 4A, taken along the line 4B—4B;

DETAILED DESCRIPTION OF A PREFERRED EMBODIMENT OF THE INSTANT INVENTION

Figure 1:
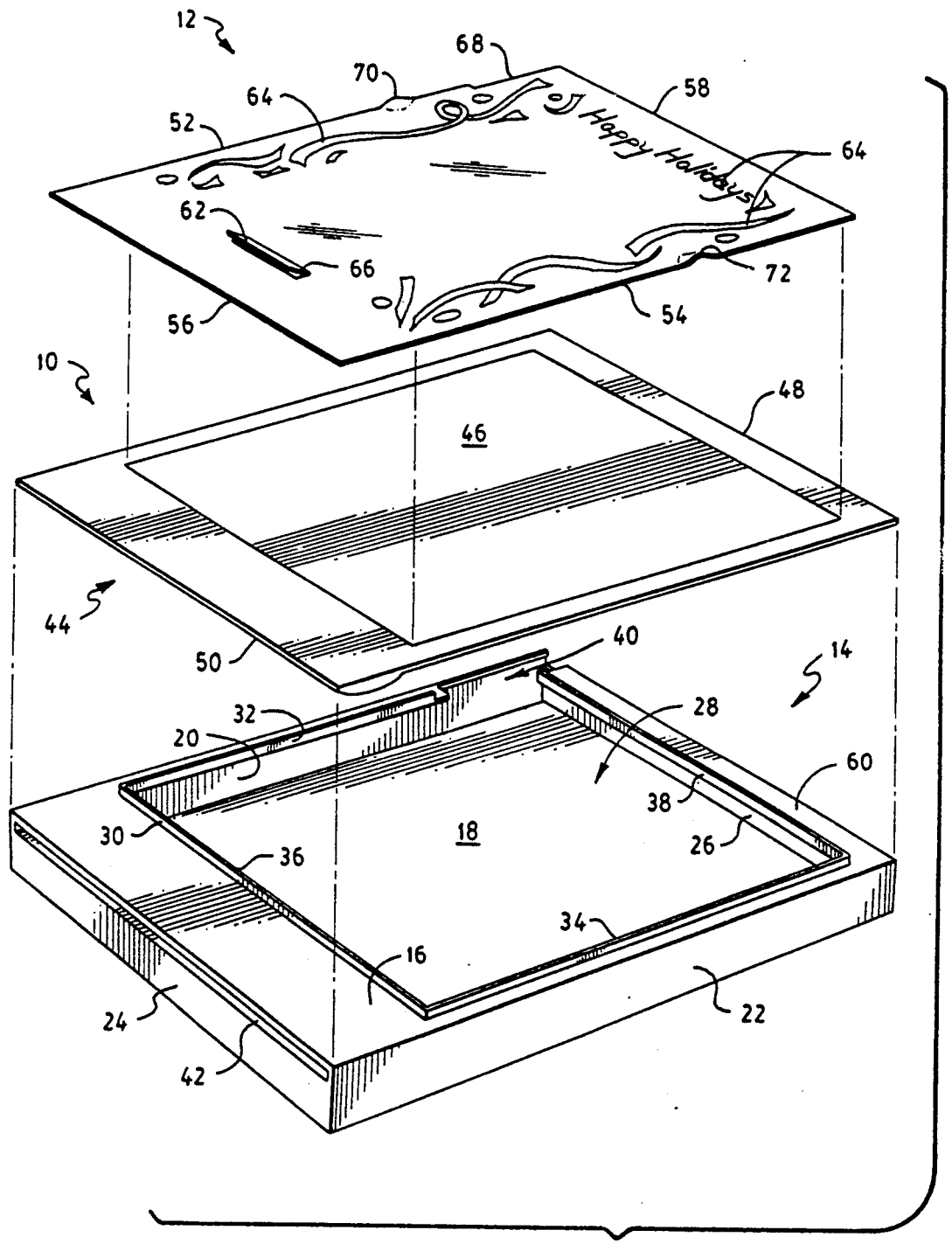
FIG. 1 is an exploded perspective view of a photographic film assemblage and a preferred embodiment of an image bearing template which is adapted for use therewith.

Reference is now made to FIG. 1 of the drawings wherein is shown a photographic film assemblage 10 and a preferred embodiment of an image bearing template 12 which is specifically designed for use therewith. The film assemblage 10 includes a cassette 14 having spaced forward and bottom walls 16 and 18, a pair of laterally spaced side walls 20 and 22, and longitudinally spaced leading and trailing end walls 24 and 26, respectively. The forward wall 16 includes therein an exposure window 28 defined by an upstanding integral rib 30. The rib 30 includes parallel, laterally spaced, longitudinally extending edges 32 and 34, with the edge 32 being shorter in length than the edge 34, and parallel, longitudinally spaced, laterally extending edges 36 and 38. The forward wall 16 also includes an elongate opening 40 which also extends part way down the trailing end wall 26. The leading end wall 24 cooperates with an edge of the forward wall 16 to define a film exit opening 42.

Supported within the cassette 14 is a stack of individual film units 44 (only one being shown), preferably of the instant or self-developing type and a spring platen (not shown) for supporting and urging the stack toward the forward wall 16 such that the uppermost film unit 44 in the stack is located in engagement with the interior surface of the forward wall 16. Thus positioned, the photosensitive area 46 of the film unit 44 is located in alignment with the exposure window 28. A dark slide (not shown) is initially located between the uppermost film unit 44 and the interior surface of the forward wall 16 to prevent premature exposure of the film unit 44 during loading of the film assemblage 10 into a camera. Subsequent to such loading, a camera mounted film advancing means is actuated such that it enters the cassette 14 via the opening 40, engages a trailing edge of the dark slide and moves its leading end out of the cassette 14 via the opening 42 and into the bite of a pair of rollers which complete the removal of the dark slide. With the dark slide removed, the uppermost film unit 44 is urged upwardly by the spring platen into engagement with the forward wall 16 for its exposure. Subsequent to its exposure, the aforementioned film advancing means is again actuated so as to move it into engagement with a trailing edge 48 of the film unit 44 and move the latter partially out of the cassette 14 via the opening 42 and into the bite of the aforementioned rollers. As is well known in the art, the rollers continue the advancement of the exposed film unit 44 from the cassette 14 while simultaneously rupturing a container 50 of processing liquid and spreading its contents between predetermined layers of the film unit 44 so as to initiate the formation of a visible image therein.

In accordance with the instant invention, the image produced within the film unit 44 may be enhanced by placing the image bearing template between the image bearing light entering the camera via its objective lens and shutter and the film unit being exposed. At this point it should be noted that although the templates shown in the drawings produce images having a finite definition, the term "image bearing template" also includes a template which will produce an image having a nonfinite definition. An example of a finite definition would be that formed by the indicia "HAPPY HOLIDAYS" on the template 12. An example of an image of nonfinite definition would be one where the image being superposed on the film unit by the template would appear to fade away or dissolve as it "moves" toward the subject being photographed, much like a vignette having undefined borders.

The image bearing template 12 is a thin (0.005") generally planar, rectangular, resilient sheet of transparent material, e.g., Mylar. The template 12 includes laterally spaced, parallel, longitudinally extending side edges 52 and 54, and longitudinally spaced, laterally extending leading and trailing edges 56 and 58, respectively. The lateral distance between the side edges 52 and 54 is substantially the same as, or slightly less than, the corresponding lateral distance between the edges 32 and 34 of the exposure window defining rib 30. The longitudinal distance between the leading and trailing edges 56 and 58 is greater than the corresponding distance between the edges 36 and 38 of the rib 30 but less than the corresponding distance between the cassette's leading and trailing end walls 24 and 26, respectively. The template 12 may be manually inserted into its operative position between the dark slide (not shown) and the interior surface of the forward wall 16 of the cassette by sliding the trailing edge 58 under a trailing end portion 60 of the cassette's forward wall 16 and then flexing the template 12 so as to enable its leading edge 56 to be inserted under the edge 36 of the rib 30. Thus located, the user may now allow the template 12 to resume its unflexed condition thus permitting the leading end of the template to slide to a position under the forward wall 16 and on top of the aforementioned dark slide. Alternatively the template 12 may be a part of the film assemblage 10 when it is originally assembled at the factory. When the template 12 is located in its operative position, a stop 62 is located substantially adjacent to the edge 36 such that engagement between the two will not only prevent the removal of the template 12 from the film cassette 14 in response to the friction applied thereto during the removal of the dark slide, but it also, in combination with the adjacency of the trailing edge 58 with the trailing end wall 26, prevents an indicia or image bearing portion 64 of the template from becoming longitudinally displaced relative to the photosensitive area 46 of the uppermost film unit 44. The stop 62 may be formed by stamping out a generally U-shaped section and folding it about an integral laterally extending hinge 64. The longitudinal distance between the stop 62 and the edge 58 of the template is substantially equal to, or slightly less than, the corresponding distance between the edge 36 and the interior surface of the trailing end wall 26 of the cassette 14. It should be noted that the template 12 may be cut away at 68 such that the aforementioned film advancing means may be provided with additional clearance as it extends into the cassette 14, via the opening 40, and engages either the trailing end of the dark slide, or the uppermost film unit 44 if the dark slide has been previously removed, without being able to engage the template 12.

Lateral movement of the template 12 relative to the exposure window 28 is prevented by a pair of upwardly projecting dimples 70 and 72 integrally formed in the edges 52 and 54, respectively. These dimples are adapted to engage the adjacent edges 32 and 34 of the rib 30 to prevent said lateral displacement.

The aforementioned indicia 64 may be printed on either side of the template. However, it is preferred to print the indicia on the side of the template 12 facing away from the film unit in order to prevent scratching of the indicia and possible removal of a portion thereof during removal of an underlying dark slide or film unit. Such indicia may be originally protected by a peelable transparent cover sheet which would be releasably secured to the face of the template containing the indicia and which would be manually removed therefrom prior to inserting the template into the cassette.

ALTERNATIVE EMBODIMENTS OF THE INVENTION

Reference is now made to FIGS. 2A and 2B wherein is shown an alternative embodiment of an image bearing template 80. The template 80, as with all of the templates described herein, is formed from a thin, generally planar, resilient sheet of transparent material, e.g., Mylar. The template 80 includes leading and trailing edges 82 and 84, and a pair of laterally spaced, longitudinally extending side edges 86 and 88, respectively. The template 80 also includes a pair of laterally extending, upwardly turned stops 90 and 92. The stops 90 and 92 are located on opposite sides of a tongue like member 94. The lateral distance between the side edges 86 and 88 is substantially equal to, or slightly less than, the corresponding distance between the edges 32 and 34 of the exposure window defining rib 30. The longitudinal distance between the leading and trailing edges 82 and 84, respectively, is slightly less than the corresponding distance between the interior surfaces of the cassette's leading and trailing end walls 24 and 26, respectively. The longitudinal distance between the integral stops 90 and 92 and the trailing edge 84 is substantially equal to, or slightly less than, the corresponding distance between the edge 36 of the cassette's rib 30 and the interior surface of the trailing end wall 26.

When the template 80 is properly positioned with the cassette 14, the tongue 94 is located between the interior surface of the forward wall 16, at the end thereof closest to the leading end wall 24, and the dark slide; and the edge 84 is located under the portion 60 of the forward wall 16 and on top of the dark slide. Thus positioned, the stops 90 and 92 and the edge 36 of the rib 30 are located in engagement with each other to prevent the movement of the template 80 from the cassette 14 during the movement of an underlying element, dark slide or film unit, from the cassette, as previously explained, and movement of the template 80 toward the trailing end wall 26 is prevented by the close adjacency of the latter with the template's trailing edge 84. Also, lateral movement of the template 80 relative to the cassette 14 is restricted by the ends 96 and 98 of the stops 90 and 92, respectively, engaging the adjacent edges 32 and 34 of the rib 30.

Still another embodiment of an image bearing template is shown in FIGS. 3A and 3B and is generally indicated by the reference character 100. The template 100 has a generally planar octagonal configuration including leading and trailing edges 104 and 102, and side edge portions 106 and 108 which are upwardly turned at a right angle to the remainder of the template 100. Each of the edge portions 106 and 108 has a height substantially equal to, or slightly less than, the height of the rib 30 of the cassette 14. The edge portion 106 has a pair of opposite ends 110 and 112 while the edge portion 108 has a pair of opposite ends 114 and 116. The length of each edge portion 106 and 108 is equal to, or slightly less than the corresponding distance between the edges 36 and 38 of the cassette's rib 30, thus substantially limiting the degree of longitudinal movement of the template 100 during removal of a dark slide or film unit 44 from the cassette 14. The lateral distance between outwardly facing surfaces of the edge portions 106 and 108 is substantially equal to, or slightly less than, the corresponding distance between the edges 32 and 34 of the rib 30 thereby substantially limiting lateral movement of the template 100 relative to the cassette 14. Thus, as with the stops 90 and 92 in the template 80, the upturned edge portions 106 and 108 function to prevent relative movement of the template 100 in both the longitudinal and lateral directions. The template 100 has sufficient flexibility, regardless of the upturned edge portions 106 and 108, that its ends may be bowed during its insertion beneath the upper wall 16 of the cassette 14.

Still another embodiment of an indicia bearing template is shown at 120 in FIGS. 4A and 4B. The template 120 includes longitudinally spaced, laterally extending, leading and trailing edges 122 and 124, respectively, and laterally spaced, longitudinally extending side edges 126 and 128. A laterally extending generally L-shaped member has one leg 130 fixedly secured to an upper surface of the template 120 and its other leg 132 extending upwardly therefrom at substantially a right angle. The longitudinal distance between the leading and trailing ends 122 and 124 of the template 120 is substantially equal to, or slightly less than, the corresponding distance between the facing surfaces of the cassette's leading and trailing end walls 24 and 26; while the longitudinal distance between the leg 132 of the L-shaped member and the trailing edge 124 is substantially equal to, or slightly less than, the corresponding distance between the edge 36 of the rib 30 and the interior surface of the trailing end wall 26. The lateral distance between the edges 126 and 128 of the template 120 is substantially equal to, or slightly less than, the corresponding distance between the edges 32 and 34 of the cassette's rib 30. Thus, when the leading edge 122 is inserted under the forward wall 16 of the cassette 14, the template 120 is then moved in a longitudinal direction toward the cassette's leading end wall 24 until the upstanding leg 132 engages the edge 36 of the rib 30. The template 120 may now be flexed and its trailing edge slipped under the portion 60 of the forward wall 16. Thus located, the leg 132 and the trailing edge 124 substantially prevent longitudinal movement of the template 120 relative to the cassette 14; while the opposite end faces of the legs 130 and 132 substantially prevent lateral relative movement between the two.

Figure 5A:
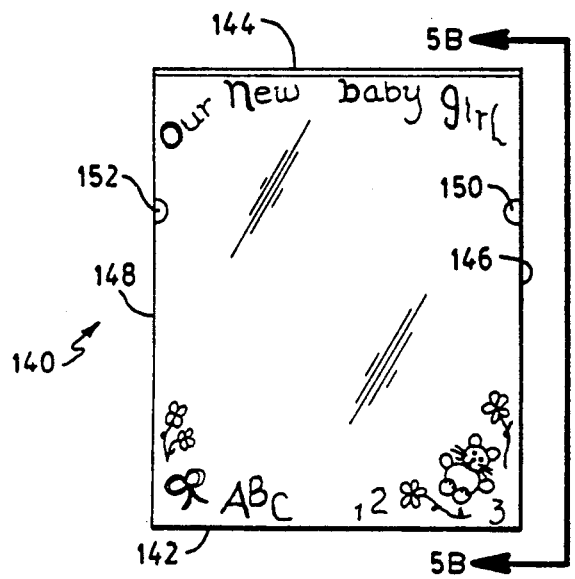
FIG. 5A is a plan view of still another embodiment of an image bearing template.
Figure 5B:
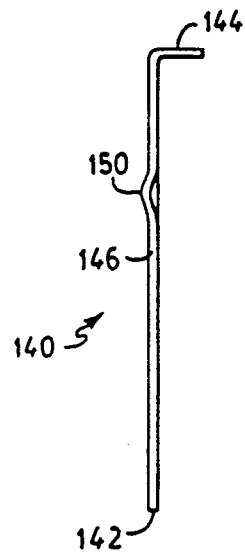
FIG. 5B is a side view of the image bearing template of FIG. 5A, taken along the line 5B—5B.

Reference is now made to FIGS. 5A and 5B wherein is shown still another embodiment of an indicia bearing template, generally identified by the reference character 140 whose indicia is representative of a new baby girl. The template 140 includes a leading edge 142 and a trailing edge 144 which is directed downwardly from the main body of the template 140. The template also includes laterally spaced, longitudinally extending side edges 146 and 148 each of which is formed with an upwardly extending dimple 150 and 152, respectively. The longitudinal distance between the leading and trailing edges 142 and 144 is substantially equal to, or slightly greater than, the corresponding distance between the interior surface of the cassette's trailing end wall 24 and the edge 36 of the rib 30. The lateral distance between the edge 146 and 148 is substantially equal to, or slightly less than, the corresponding distance between the edges 32 and 34 of the rib 30.

The template 140 is adapted to be assembled with the film assemblage 10 at the factory. When properly positioned within the film cassette 14, the downwardly directed trailing edge 144 is trapped between the stack, comprised of the film units 44 and the dark slide and the interior surface of the cassette's trailing end wall 26, and the remainder of the template 140 is located between the dark slide and the interior surface of the cassette's forward wall 16 with the indicia of the template 140 located in alignment with the photosensitive area 46 of the film unit 44. Thus located, longitudinal movement of the template 140 is restricted because the downwardly directed trailing edge 144 is trapped between the stack and the trailing end wall 26, and lateral movement of the template 140 is substantially prevented by the contact between the dimples 150, 152 and the side edges 34 and 32, respectively.

Figure 6:
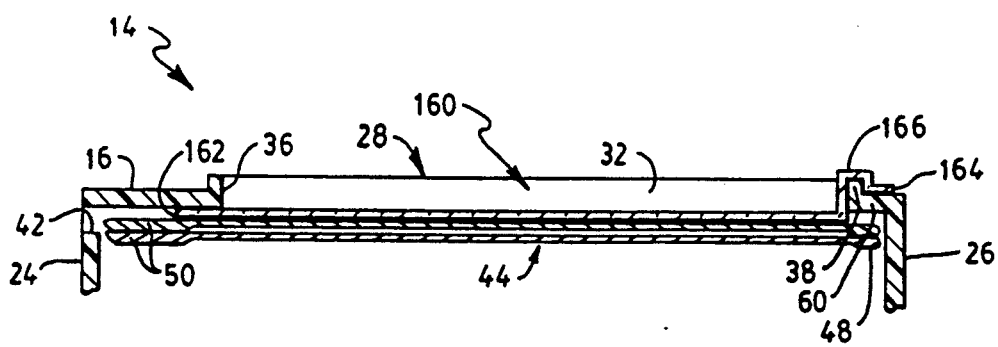
FIG. 6 is a side view, in section, of still another embodiment of an image bearing template shown in its operative position relative to the film cassette shown in FIG. 1.

Still another embodiment of an indicia bearing template is shown at 160 in FIG. 6. In this view, the template 160 is shown as it would appear after the dark slide has been removed. The template 160 is substantially rectangular in plan view and has a lateral dimension substantially equal to or slightly less than that between the edges 32 and 34 of the rib 30. The template 160 may be provided with a cutout similar to that shown at 68 in the template 12 in FIG. 1 to prevent it from being removed from the cassette 14 by the camera's film advancing means (not shown). The template 160 extends from a leading edge 162 rearwardly (to the right as viewed in FIG. 6) completely across the exposure window 28 to the edge 38 of the rib 30 where it then turns upwardly and over the edge 38 and finally terminates at its trailing edge 164. A portion 166 of the template 160 may be fixedly secured by any suitable means, e.g., adhesive, to the top of the edge 38, and/or the trailing end of the template 160 adjacent to the trailing edge 164 may be similarly secured to the portion 60 of the cassette's forward wall 16. The leading edge 162 may be similarly secured to the interior surface of the forward wall 16 by a pressure sensitive adhesive.

Since certain changes may be made in the above described invention without departing from the scope thereof, it is intended that all matter contained in the above description or shown in the accompanying drawings shall be interpreted as illustrative and not in a limiting sense. For example, while only the embodiments of the template shown in FIGS. 1 and 6 have been described as having a cutout so as to prevent the camera's film advancing means from engaging it during removal of a dark slide or an exposed film unit, it is within the scope of the invention to provide such a cutout in any or all of the templates described above if such a precaution is deemed necessary to the proper operation of the invention.

What is claimed:

1. A film assemblage including an image bearing template formed from a single sheet of material for use with a cassette having an exposure window and a film exit opening and at least one film unit adapted to be positioned within the cassette with its photosensitive area in alignment with the exposure window, comprising in combination:

a cassette having an exposure window in a forward wall thereof, a film exit opening in a leading end wall and a trailing end wall;

a least one film unit located within said cassette with a photosensitive area located in alignment with said exposure window;

a thin transparent image bearing sheet having leading and trailing edges and longitudinally extending, laterally spaced, side edges, said sheet having a first dimension substantially the same as a lateral dimension of said exposure window and a second dimension greater than a longitudinal dimension of said exposure window;

first means formed from said thin sheet protruding integrally upward from said thin sheet at a location intermediate said leading and trailing edges and spaced inwardly of said side edges, said first means having a lateral dimension substantially less than the corresponding lateral dimension of said exposure window, said first means being adapted to be located in a position substantially adjacent to a laterally extending edge of said exposure window so as to cooperate therewith to prevent the removal of said thin sheet from said cassette in response to the movement of said film unit from said cassette via said film unit opening; and second means formed from said thin sheet extending integrally upward from said thin sheet at laterally opposite edges of said thin sheet at locations intermediate said leading and trailing edges, said second means being spaced apart by a distance substantially equal to the lateral dimension of said exposure opening and being adapted to engage adjacent longitudinally extending edges of said exposure opening.

2. The combination as defined in claim 1 wherein a longitudinal dimension between said first means and said trailing edge is substantially equal to a corresponding dimension between a laterally extending edge of said exposure window located adjacent to said first means and said trailing end wall of said cassette.

3. A film assemblage including an image bearing template formed from a single sheet of material for use with a cassette having an exposure window and a film exit opening and at least one film unit adapted to be positioned within the cassette with its photosensitive area in alignment with the exposure window, comprising in combination:

a cassette having an exposure window in a forward wall thereof, a film exit opening in a leading end wall and a trailing end wall;

a least one film unit located within said cassette with a photosensitive area located in alignment with said exposure window;

a thin transparent image bearing sheet having leading and trailing edges and longitudinally extending, laterally spaced, side edges, said sheet having a first dimension substantially the same as a lateral dimension of said exposure window and a second dimension greater than a longitudinal dimension of said exposure window;

first means protruding integrally upward from said thin sheet at a location intermediate said leading and trailing edges and spaced inwardly of said side edges, said first means having a lateral dimension substantially less than the corresponding lateral dimension of said exposure window, said first means being adapted to be located in a position substantially adjacent to a laterally extending edge of said exposure window so as to cooperate therewith to prevent the removal of said thin sheet from said cassette in response to the movement of said film unit from said cassette via said film unit opening, a longitudinal dimension between said first means and said trailing edge is substantially equal to a corresponding dimension between a laterally extending edge of said exposure window located adjacent to said first means and said trailing end wall of said cassette; and upwardly projecting dimples extending integrally upward from said thin sheet at laterally opposite edges of said thin sheet at locations intermediate said leading and trailing edges, said dimples being spaced apart by a distance substantially equal to the lateral dimension of said exposure opening and being adapted to engage adjacent longitudinally extending edges of said exposure opening.

4. The combination as defined in claim 3 further including a longitudinally extending, recessed section along one of said side edges at a location between one of said dimples and said trailing edge.

5. A film assemblage including an image bearing template formed from a single sheet of material for use with a cassette having an exposure window and a film exit opening and at least one film unit adapted to be positioned within the cassette with its photosensitive area in alignment with the exposure window, comprising in combination:

a cassette having an exposure window in a forward wall thereof, a film exit opening in a leading end wall and a trailing end wall;

a least one film unit located within said cassette with a photosensitive area located in alignment with said exposure window;

a thin image bearing transparent sheet having leading and trailing edges and longitudinally extending, laterally spaced, side edges, said sheet having a first dimension substantially the same as a lateral dimension of said exposure window and a second dimension greater than a longitudinal dimension of said exposure window; and means comprising a pair of laterally spaced members formed from said single sheet protruding integrally upward from said thin sheet at locations intermediate said leading and trailing edges, each of said members having a lateral dimension substantially less than the corresponding lateral dimension of said exposure window, said members being adapted to be located in a position substantially adjacent to a laterally extending edge of said exposure window so as to cooperate therewith to prevent the removal of said thin sheet from said cassette in response to the movement of said film unit from said cassette via said film exit opening, each of said members being spaced from said trailing edge by a distance substantially equal to a corresponding distance between the laterally extending edge of said exposure aperture and said trailing end wall of the cassette thereby preventing movement of said template toward said trailing end wall.

6. A film assemblage including an image bearing template formed from a single sheet of material for use with a cassette having an exposure window and a film exit opening and at least one film unit adapted to be positioned within the cassette with its photosensitive area in alignment with the exposure window, comprising in combination:

a cassette having an exposure window in a forward wall thereof, a film exit opening in a leading end wall and a trailing end wall;

a least one film unit located within said cassette with a photosensitive area located in alignment with said exposure window;

a thin image bearing transparent sheet having leading and trailing edges and longitudinally extending, upwardly directed, laterally spaced side edge portions, said sheet having a longitudinal dimension greater than a longitudinal dimension of said exposure window, said side edge portions being located intermediate said leading and trailing edges and at least one of said side edge portions having a longitudinal dimension substantially equal to the longitudinal dimension of said exposure window, said at least one side edge portion having an end adapted to be located in a position substantially adjacent to a laterally extending edge of said exposure window so as to cooperate therewith to prevent the removal of said thin sheet from said cassette in response to the movement of said film unit from said cassette via said film exit opening, and said side edge portions being spaced apart by a distance substantially equal to a lateral dimension of said exposure opening and being adapted to engage adjacent longitudinally extending edges of said exposure opening.

7. The combination as defined in claim 6 wherein each of said side edge portions has a height substantially equal to the height of said longitudinally extending edges of said exposure opening.

8. A photographic film assemblage comprising:

a cassette having an exposure window in a forward wall thereof, a film exit opening in a leading end wall and a trailing end wall;

a stack of film units located within said cassette with a photosensitive area of an uppermost film unit in said stack located in alignment with and adjacent to said exposure window; and an image bearing template formed from a single sheet of transparent material, said template having a leading edge, a downwardly turned trailing edge and longitudinally extending, laterally spaced, side edges, said template having a lateral dimension substantially equal to a lateral dimension of said exposure window and a longitudinal dimension greater than a longitudinal dimension of the exposure window, said template further being adapted to be located within said cassette at a location wherein 1) a major portion of said template is located between said uppermost film unit and an interior surface of said forward wall with its imprinted image located in alignment with said exposure window, and 2) said downwardly turned trailing edge is trapped between trailing ends of said stack of film units and said trailing end wall of said cassette thus preventing removal of said template from said cassette in response to the movement of an underlying film unit from said cassette via said film exit opening.

9. A photographic film assemblage as defined in claim 8 further including means extending integrally upward from said template at said side edges at locations intermediate said leading and trailing edges, said means being spaced apart by a distance substantially equal to the lateral dimension of the exposure opening and being adapted to engage adjacent longitudinally extending edges of the exposure opening.

10. A photographic film assemblage as defined in claim 9 wherein said means includes a dimple.

11. A photographic film assemblage comprising:
a cassette having an exposure window in a forward wall thereof; a film exit opening in a leading end wall and a trailing end wall;
a stack of film units located within said cassette with a photosensitive area of an uppermost film unit in said stack located in alignment with and adjacent to said exposure window; and
an image bearing template formed from a single sheet of flexible transparent material, said template including leading and trailing edges longitudinally spaced from each other by a distance greater than a longitudinal distance between a laterally extending edge of said exposure window and said trailing end wall, and longitudinally extending side edges laterally spaced from each other by a distance substantially equal to a lateral distance between longitudinally extending edges of said exposure window, said leading edge of said template being secured to an interior surface of said forward wall at a location between said exposure aperture and said leading end wall and said trailing edge being secured to an exterior surface of said cassette at a point adjacent said trailing end wall.

* * * * *